United States Patent [19]

Linder et al.

[11] 4,354,698

[45] Oct. 19, 1982

[54] SWIVEL JOINT CONSTRUCTION FOR PRESSURE CONTAINING CONDUIT

[75] Inventors: Morris B. Linder; John J. Beffano, both of Houston, Tex.

[73] Assignee: Quality Valve & Machine Works, Inc., Houston, Tex.

[21] Appl. No.: 191,507

[22] Filed: Sep. 29, 1980

[51] Int. Cl.³ .............................................. F16L 27/00
[52] U.S. Cl. ..................................... 285/98; 285/272; 285/371; 285/373
[58] Field of Search .................. 285/98, 272, 281, 415, 285/414, 373, 371

[56] References Cited

U.S. PATENT DOCUMENTS

| | | | |
|---|---|---|---|
| 944,877 | 12/1909 | Koschinski | 285/415 X |
| 3,113,792 | 12/1963 | Brown | 285/415 X |
| 3,372,948 | 3/1968 | Arneson | 285/98 |
| 3,848,899 | 11/1974 | Smith | 285/98 |
| 3,997,198 | 12/1976 | Linder | 285/281 X |

FOREIGN PATENT DOCUMENTS

915065 1/1963 United Kingdom ................ 285/281

Primary Examiner—Thomas F. Callaghan

[57] ABSTRACT

A swivel joint for pressure containing conduits such as movable flow lines may comprise a pair of hub elements each having means establishing interconnection with a section of flow line, the hub elements being abutted in such a manner as to define a flow passage through the swivel joint construction. A thrust flange is formed on each of the hub elements, the flanges being retained within a split housing structure that serves to retain the swivel joint in assembly. Rotatable relationship between the hub elements and the body structure is established by a thrust bearing that is interposed between an internal shoulder of the housing and a segmented bearing retainer that also forms a part of one of the thrust flanges. A low friction spacer element may be disposed between the thrust flanges of the hubs to prevent the development of friction retardation of swivel movement. The hubs interfit to define a sealed recess within which is received a seal sleeve that is of sufficient length to transition the joint between the abutted hubs. The split bearing retainer enables the thrust bearing to be easily removed and replaced by means of field repair.

21 Claims, 5 Drawing Figures

SWIVEL JOINT CONSTRUCTION FOR PRESSURE CONTAINING CONDUIT

FIELD OF THE INVENTION

This invention relates to the subject matter set forth in U.S. Pat. No. 3,997,198, of common inventorship herewith. This invention relates generally to a swivel construction for conduits enabling one conduit to be rotated relative to another while the conduits are under pressurized condition and transporting flowing fluid. More specifically, the present invention is directed to a swivel joint construction for flow lines such as might be interconnected between the blow-out preventer stack of deep well drilling apparatus and a choke-and-kill manifold that is provided to enable a well to be rapidly shut in, in the event such becomes necessary.

BACKGROUND OF THE INVENTION

In the drilling of deep wells such as oil wells it is necessary to provide the oil well drilling equipment with some means to prevent the well from blowing out when a high pressure production zone is intersected by the well bore during drilling or when some malfunction occurs either to the well drilling apparatus or within the well itself. The well drilling apparatus is therefore typically provided with one or more blow-out preventers having hydraulically energized rams that are forced into engagement with the drill stem passing therethrough. The blow-out preventers cause gripping or in some cases, crushing or positive deformation of the pipe structure in order to retain the pipe within the well and prevent it from being blown out of the well by high pressure well fluid. Immediately below the lowermost blow-out preventer of the well drilling structure may be provided an injection spool having a conduit connection allowing connection of a flow line to the spool structure, which flow line may be interconnected between the spool and a choke-and-kill manifold that is capable of injecting a high pressure medium, such as drilling mud, through the flow line and spool into the well at a pressure that counterbalances any pressure tending to force the drill stem out of the well. The fluid medium injected into the well from the choke-and-kill manifold is also used to seal or shut in a well when such is desired.

Because the choke-and-kill flow line must be capable of handling the flow of fluid at very high pressure, i.e. in the order of 5,000 to 10,000 psi or greater, it is very difficult to provide a flexible flow conduit that will safely handle the choke-and-kill fluid. One should bear in mind also that it is imperative that the choke-and-kill manifold and the flow line interconnecting the manifold with the spool of the drilling wellhead apparatus be capable of functioning without failure because the choke-and-kill system is typically the last resort in preventing well blowouts from occurring. The flow line must not rupture or leak.

One problem occurs frequently, especially when drilling is being conducted from an offshore platform: The choke-and-kill flow line, if composed of rigid piping, is typically subjected to significant mechanical stresses which are induced by movement of the derrick and derrick support platform structure relative to one another. It is inevitable that some relative derrick, platform and drilling head movement will occur because of the frequency adverse conditions under which drilling is accomplished and because the platform construction, being composed largely of fabricated steel structure, reacts to various forces acting thereupon. Rigid flow lines interconnecting relatively movable objects could become excessively strained or fatigued and therefore rupture or leak under high pressure.

In the past, flexible conduits have been employed as choke-and-kill lines, but, as indicated above, when extremely high pressures are expected to be encountered, it is typically impractical to consider flexible flow line structures that will be capable of withstanding the internal pressure that could be applied thereto during choke-and-kill operations. Flow lines have been provided that incorporate rigid flow line sections, the various sections being interconnected by means of swivel joints that are variously oriented in such manner as to account for relative movement between the choke-and-kill manifold, which is mounted on the well drilling platform, and the spool structure of the well drilling apparatus, which is connected to a conductor conduit that extends downwardly through the platform apparatus and into the upper earth formation beneath the ocean floor. A major problem with swivel jointed flow line mechanisms that have been provided in the past is the fact that the swivel joints incorporate sealing elements that are incapable of withstanding the internal pressure applied thereto and yet remain movable under low torque. Further, the trust bearings of the swivel joint structures are easily contaminated with the fluid contained within the flow line, thereby causing rather rapid deterioration of the swivel joints themselves. Additionally, increase of pressure within presently available swivel joint constructions typically causes a subsequent increase in the friction retarding characteristics thereof which has a tendency to limit free movement of the swivel joint construction as well drilling operations are conducted. It is highly desirable therefore to provide a flow line construction for interconnection of the well drilling spool and the choke-and-kill manifold that will accommodate relative movement between the spool and the manifold and yet will maintain optimum sealing ability at all times.

Most swivel joint constructions incorporate bearing assemblies and seals that cannot be replaced by means of field repair. In the event seal leakage occurs or in the event bearings become worn to the point that replacement is necessary, the entire swivel joint conduit must be removed and transported to a suitable site for repair. Since drilling rig down time is critical, a replacement swivel joint conduit must be maintained on location, thereby adding to the expense of the drilling operation. In the alternative, the drilling operation can be discontinued until a replacement swivel joint conduit can be transported to the drilling site. It is desirable therefore to provide a swivel joint conduit mechanism wherein the bearings and seals thereof may be replaced by means of field repair.

It is therefore a primary feature of this invention to provide a novel swivel joint conduit assembly wherein the seals and bearings of each of the swivels thereof may be replaced by means of field repair.

It is also a feature of the present invention to provide a novel swivel joint construction for flow lines that incorporates pressure enhanced sealing elements that provide leak free swivel joint operation at all of the pressure ranges thereof.

It is another important feature of the present invention to provide a novel swivel joint construction for flow lines wherein the swivel joint structure incorporates thrust bearings and the seal structure of the swivel joint construction effectively prevents contamination of the bearings by the fluid controlled by the flow line.

Among the several features of the present invention is noted to be contemplation of a novel swivel joint construction for flow lines wherein a swivel joint housing structure is provided that is not a pressure containing structure, but rather only provides mechanical support to withstand the thrust loading that is applied thereto in response to the pressure contained within the swivel joint structure.

It is also a feature of the present invention to provide a novel swivel joint construction incorporating a pair of relatively movable hubs that are retained by a housing construction, the hubs being free for relative rotation throughout the entire pressure range of the swivel joint construction.

It is also an important feature of the present invention to provide a novel swivel joint construction for movable high pressure flow lines incorporating lubricating means that enable simple and efficient lubrication of the bearings of the swivel joint construction.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention. For example, although the present invention is described principally as it relates to utilization in conjunction with offshore drilling rigs, especially of the platform type, it is not intended in any way to limit the present invention to any particular type of drilling rig nor is it intended to limit utilization of the present invention in conjunction with drilling rigs. It is intended that the invention may have application, within the spirit and scope of the present invention, in any environment where relatively movable objects are connected by a high pressure flow line.

SUMMARY OF THE INVENTION

The swivel joint construction of the present invention may be utilized in conjunction with other identical or similar swivel joints in order to allow a flow line to have freedom of movement while maintaining a positive seal at each of the swivel joints, even though the flow line may be subjected to extremely high internal pressure. A pair of hub elements may be provided each having thrust flange means provided thereon and the hubs may be disposed in opposed relationship with the flange means being located within a housing that may be a two-part sectional housing structure. To facilitate relative rotational movement between the flange means within the housing structure, a thrust bearing is supported by a segmented bearing retainer and thrust flange insert that forms a part of at least one of the thrust flange means. The thrust bearing is interposed between the bearing retainer insert and a thrust surface formed on the housing structure and serves to transmit thrust loading from the bearing retainer insert to the housing structure and yet allow one of the hubs to have freedom of rotational movement. A radially movable retainer ring is received within an annular groove defined by the split thrust flange insert to enable the insert to be retained in assembly with the rotatable hub prior to assembly of the bearing thereabout.

The hubs interfit to define an annular elongated seal recess, within which may be disposed an elongated seal carrier that forms a transition bridging the joint defined between the opposed hubs. The seal carrier may be related to the elongated recess in such a manner as to define a pair of seal pockets, within which may be disposed a primary sealing assembly that is pressure energized to enhance the sealing ability thereof and which prevents fluid within the flow passage of the swivel from flowing through the joint between the hubs. Each of the primary sealing elements may comprise a relatively hard annular sealing body composed of plastic material such as polytetrafluoroethylene or some other suitable, relatively hard, friction resistant plastic sealing material. The sealing body may be of substantially U-shaped cross-sectional configuration, defining opposed flanges or lips that are pressure activated to enhance the sealing ability thereof. The relatively hard sealing body is designed for a slight degree of mechanical deformation upon assembly of the swivel structure in order to provide an initial seal against wall structure defining the seal pocket within which it is contained. The sealing body is also formed to define an annular groove within which may be disposed a relatively soft elastomeric annular sealing element such as might be composed of Viton or some other suitable rubber-like sealing material. The elastomeric sealing element establishes sealing contact between the retainer element and the sealing body and is yieldable or movable responsive to increasing pressure to cause the sealing flanges or lips of the relatively hard sealing element to yield or be moved into tighter sealing engagement with the wall structure defining the seal pocket. The sealing ability of the primary seal assemby is therefore enhanced by fluid pressure applied thereto.

A plurality of annular seal grooves may also be formed in the exterior surface of the seal sleeve element, each of which may retain an annular sealing element establishing a plurality of secondary seals between the seal carrier element and the hubs.

The relatively hard, friction resistant body portions of the primary sealing elements function, together with an annular friction resistant washer interposed between the thrust flanges of the hubs, to allow rotation of one of the hubs as one of the conduits is rotated relative to the swivel structure.

BRIEF DESCRIPTION OF THE DRAWINGS

In order that the manner in which the above-recited advantages and objects of the invention are attained, as well as others, which will become apparent, can be understood in detail, more particular desription of the invention, briefly summarized above, may be had by reference to the specific embodiment thereof that is illustrated in the appended drawings, which drawings form a part of this specification. It is to be understood, however, that the appended drawings illustrate only a typical embodiment of the invention and therefore are not to be considered limiting of its scope, for the invention may admit to other equally effective embodiments.

In the Drawings.

The present invention, both as to its organization and manner of operation, may best be understood by way of illustration and example of a certain preferred embodiment when taken in conjunction with the accompanying drawings in which.

DETAILED DESCRIPTION OF PREFERRED EMBODIMENTS

Figures 1, 2:
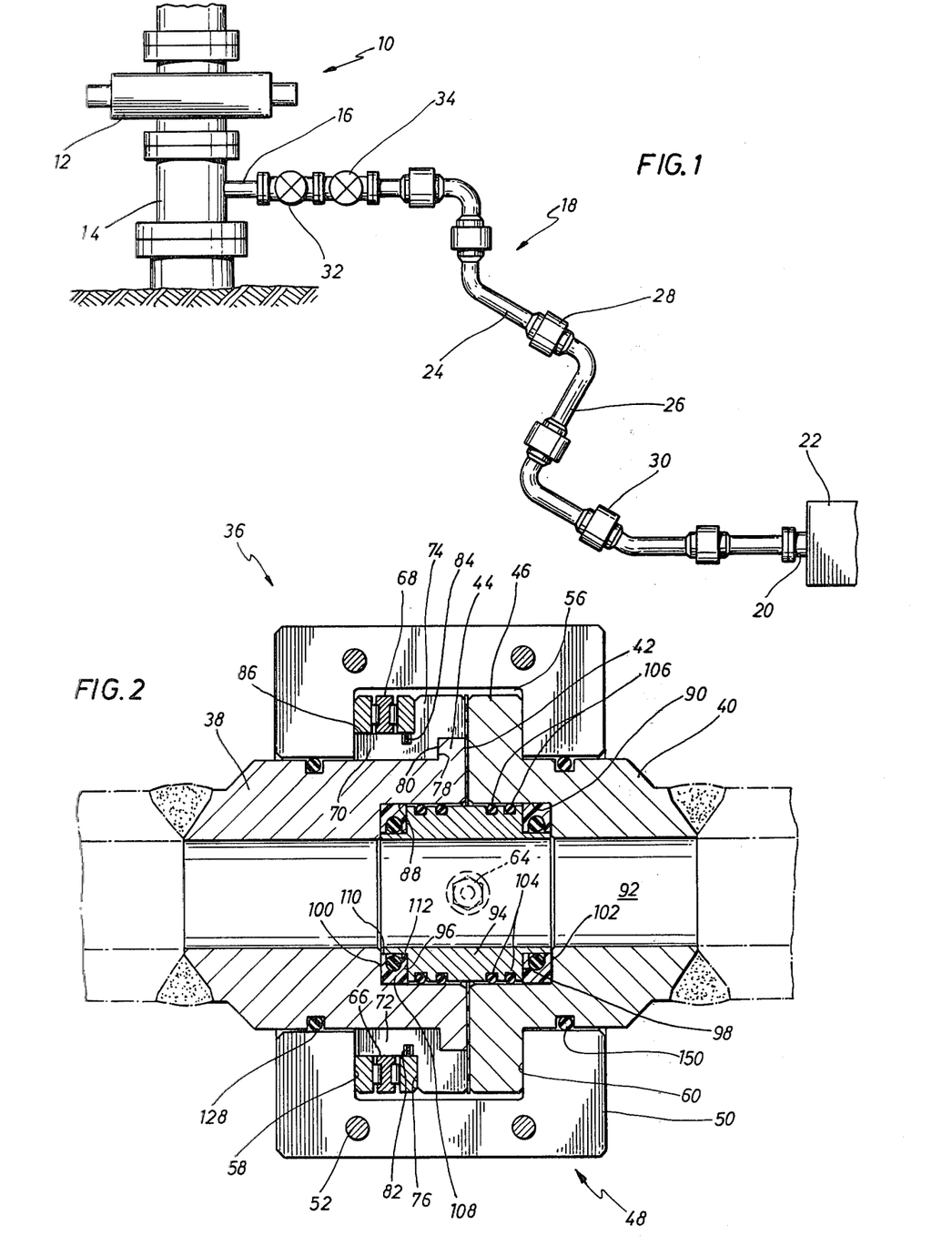
FIG. 1 is a partial elevational view of a well head assembly and a choke-and-kill manifold structure, with a flow line interconnected between these structures, which flow line is shown to be provided with six swivel connections that are constructed in accordance with the present invention.
FIG. 2 is a sectional view illustrating a swivel joint mechanism constructed in accordance with the present invention and shown to be connected to sections of flow line.

Referring now to the drawings and first to FIG. 1, there is shown a well head structure generally at 10 that is utilized during well drilling operations and which incorporates one or more blow-out preventers such as shown at 12 that are capable of functioning responsive to certain conditions, such as conditions of drastic change in pressure, to cause gripping and sealing of drill pipe that extends through the blow-out preventer structure and into the well. Immediately below the lowermost blow-out preventer may be provided a spool structure 14 having a conduit connection 16 formed integral therewith or connected thereto. A flow line, illustrated generally at 18, may be interconnected between the conduit connection 16 and a flow line connector element 20 of a choke-and-kill manifold 22. The flow line structure 18 may include a plurality of rigid flow line sections, such as shown at 24 and 26, that are interconnected by a plurality of swivel joints, such as shown at 28 and 30. Each of the swivel joints may be of substantially identical construction and may be constructed in accordance with the present invention. The swivel joints allow relative movement of the various flow line sections 24 and 26, such as might occur when portions of the drilling rig support structure yield or move relative to other portions that are bridged by the flow line structure. Valves 32 and 34 may be interconnected into the flow line structure and may control communication between the flow line and the interior of the spool 14. The plural valves 32 and 34 allow the flow line to be pressurized up to or above the pressure within the spool 14 with one of the valves being maintained in the closed position thereof. The valves then may be opened selectively to communicate fluid from the choke-and-kill manifold 22 to the spool structure 14 for the purpose of killing the well in conventional manner.

With reference now to FIG. 2, each of the swivel joint mechanisms 28 and 29 may taken the form illustrated generally at 36, where a rotatable hub element 38 and a stationary hub element 40 are shown to be disposed in slightly spaced relationship, being separated by an annular friction resisting washer 42. The washer 42 may be composed of polytetrafluoroethylene or any other suitable material having low friction characteristics. Each of the hub elements 38 and 40 may be provided with an annular thrust transmitting flange, such as shown at 44 and 46, with the flanges being disposed in juxtaposed relation and being separated only by the friction resisting washer 42. Flange 44 is of smaller diameter and width as compared to flange 46 to permit field repair as will be discussed hereinbelow.

A swivel housing structure, such as that shown generally at 48, may be composed of generally identical housing sections, one being shown at 50. The housing sections may be retained in assembly by bolts 52 that extend through apertures formed in one housing section and are threadedly received by threaded apertures formed in the opposite housing section. The housing structure 46 is formed to define a swivel chamber 56 within which the thrust transmitting flanges 44 and 46 are retained. The swivel chamber is defined in part by thrust support surfaces 58 and 60 defined by the housing structure. Lubricant passages 62 may be formed in each of the housing sections and lubricant fittings 64 in order to provide the swivel bearing with suitable lubrication. Since the lubricant fittings 64 are externally exposed, the swivel mechanism may be readily lubricated as is desirable to promote efficiency of servicing operations and to extend the useful life of the swivel joint construction.

It is highly desirable that the swivel assembly be capable of repair while in the field and the repair operations such as replacement of worn bearings and seals be capable of accomplishment in a relatively short period of time. According to the present invention, a flow line swivel assembly having such field repair capability may conveniently take the form illustrated in FIG. 2. As mentioned above, the thrust flange 44 is significantly smaller in diameter as compared to the opposing thrust flange 46 of hub 40. The diameter of the thrust flange 44 is also slightly smaller than the internal diameter 66 of the thrust bearing 68, thereby allowing the thrust bearing to pass over the flange 44 during installation and removal thereof.

It is also necessary that the thrust bearing 68 be capable of transmitting thrust forces relative to the thrust support surface 58 of the split body 48 and also relative to the flange 44. To accomplish this feature, a plurality of bearing retainer and thrust flange segments are employed as shown at 70 and 72 which cooperate to define a segmented thrust support flange 74 defining segmented thrust support surfaces 76. Although it is not intended to restrict the present invention to any particular number of bearing retainer segments, it has been determined that three mating bearing retainer segments, each including 120°, are capable of functioning quite readily for the purposes intended. There may be provided any suitable number of bearing support segments, however, without departing from the spirit and scope of this invention.

To accomplish installation of the bearing and bearing retainer segments, the flanges 44 and 46 of the hubs 38 and 40 are separated. The housing segments 50 of the swivel housing are also separated from the hubs 38 and 40 to allow installation of the bearing. The thrust bearing 68 is then moved over a smaller diameter flange 44 of the rotatable hub 38 and moved sufficiently to the left as shown in FIG. 2 as to provide adequate clearance for assembly of the bearing retainer segments with the rotatable hub. The bearing retainer segments are then installed in the position illustrated in FIG. 2, locating thrust shoulders 78 of each of the bearing retainer segments in abutting engagement with respect to an annular force transmitting surface 80 defined by the small hub flange 44. With the bearing retainer segments thus located, it is necessary to retain the segments in assembly with the rotatable hub 38 until such time as the bearing 68 may be moved into encircling assembly about the bearing retainer segments. To so retain the bearing retainer segments, each of the segments is formed to define an annular groove segment which cooperates in assembly to define an annular retainer groove 82. An annular retainer element 84 is then positioned within the retainer groove 82 and functions to retain the bearing retainer segments in assembly with the rotatable hub 38. The annular retainer element 84 may be defined by any suitable split retainer ring having a spring-like capability causing the retainer ring to be urged into the annular groove 82 and to retain the bearing retainer segments in properly assembled relation with respect to the rotatable hub. The retainer ring 84 may be composed of metal such as stainless spring steel or, in the alternative, may be composed of any other suitable material having the spring-like characteristic that is desirable for retaining the bearing retainer segments in proper assembly with the rotatable hub.

With the bearing retainer segments retained in the position illustrated in FIG. 2, the bearing element 68 is then moved laterally into assembled relation about the cylindrical surface 86 that is defined by the cylindrical segmented surfaces of the respective bearing retainer segments. With the bearing 68 so positioned, the hubs 38 and 40 may be brought into assembly with the friction-resistant washer 42 interposed therebetween and the housing segments 50 of the housing 48 may be brought into assembly with the hub bearing and bearing retainer structure in the manner shown in FIG. 2.

It will be desirable to provide the swivel construction with means for preventing fluid disposed therein from flowing through the joint between the hubs 38 and 40, which joint is occupied by the friction resisting washer 42, and thereby preventing the fluid from contaminating the bearing 68. In accordance with the present invention, each of the hub structures may be formed to define internal annular recesses, such as shown at 88 and 90, that cooperate when the hubs are in assembled position such as shown in FIG. 2, to define an elongated annular seal recess that is exposed to the flow passage 92 extending through the swivel construction. A seal carrier or retainer element 94 is positioned within the elongated seal recess and provides both primary and secondary sealing capability in order to prevent fluid within the flow passage 92 from reaching the bearing 68.

As illustrated in FIG. 2, the annular seal carrying element 94 provides a transition, bridging the space or joint defined between the opposed inner extremities of the hub elements 38 and 40 and cooperates with the hub structures to define a pair of primary seal pockets 96 and 98 within which may be contained a pair of primary seal assemblies 100 and 102, respectively. A plurality of annular grooves 104 may also be formed in the outer periphery of the annular seal carrier element 94, which annular grooves may receive a plurality of annular sealing elements 106 that establish secondary seals between the seal carrier element and respective ones of the hubs 38 and 40.

Figures 3, 4, 5:
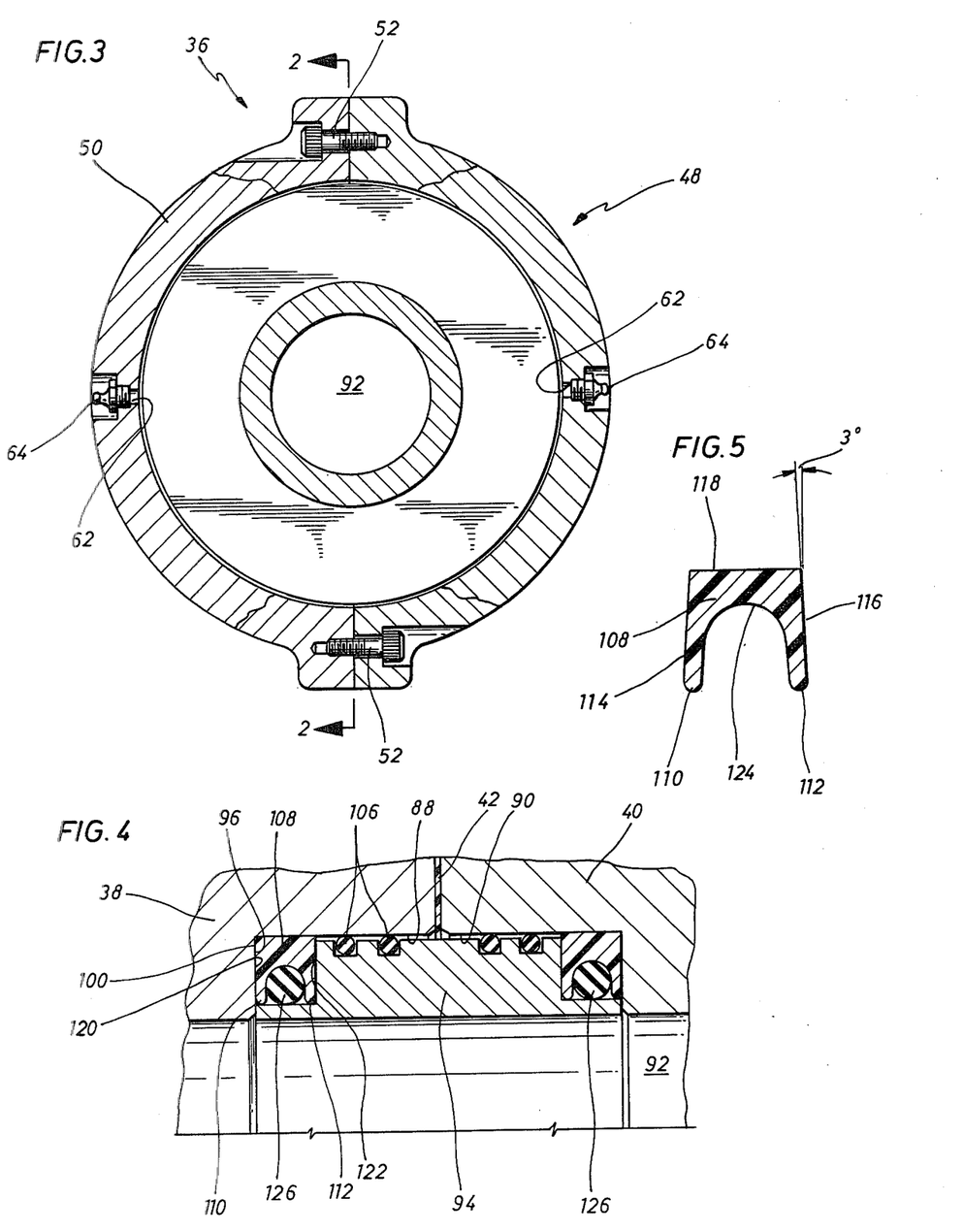
FIG. 3 is a transverse sectional view of the swivel construction of FIG. 2, the section being taken at the joint between the relatively rotatable hubs.
FIG. 4 is a fragmentary sectional view of the swivel construction set forth in FIG. 2, illustrating a seal carrier element in position within seal recesses defined in the hub structures and showing the relationship of the primary and secondary steel structures to the seal carrier and hub structures.
FIG. 5 is a fragmentary sectional view of the relatively hard body portion of the primary seal assembly shown in the uncompressed condition thereof prior to assembly to the swivel joint structure.

Referring now to FIGS. 4 and 5, the primary seal assemblies 100 and 102 may be defined by a relatively hard or stiff annular sealing body 108 that may be considered of generally U-shaped cross-sectional configuration defining a pair of annular yieldable sealing flanges or lips 110 and 112. It is desirable that the annular sealing body 108 be of friction resistant characteristic, in addition to being capable of providing sealing ability and, in accordance with the present invention, the sealing body may be composed of glass filled polytetrafluoroethylene or any other suitable relatively hard plastic sealing material.

Referring to FIG. 5, the annular sealing body 108, in the uncompressed condition thereof, may be shown to have externally tapered surfaces 114 and 116 extending from an annular generally cylindrical base surface 118. The surfaces 114 and 116 may be tapered in the order of 3° so as to cause the outer edges of the sealing flanges or lips 110 and 112 to make initial contact with side walls 120 and 122 of the sealing pocket 96. As the swivel structure is assembled, the annular sealing body will be deformed from its uncompressed state shown in FIG. 5, toward the fully compressed condition thereof illustrated in FIG. 4. It is not necessary, however, that the annular sealing body be completely compressed as shown in FIG. 4, it only being necessary that the sealing body be sufficiently compressed to establish initial sealing contact with the side walls 120 and 122 in order to provide initial sealing capability exclusive of the pressure-energized sealing capability to be discussed hereinbelow.

The annular sealing body 108 may also be formed to provide an annular groove 124 between the sealing lips 110 and 112, within which groove may be disposed a relatively soft annular sealing element 126 that substantially fits the major portion of the configuration of the groove 124. The annular sealing element 126 may be composed of Viton or any one of a number of other suitable elastomeric or rubber-like sealing materials within the spirit and scope of the present invention. The sealing element 126 conveniently takes the form of an O-ring that is subjected to a slight degree of initial compression in the unpressurized state of the swivel construction, thereby establishing an initial seal between the seal carrier element 94 and the annular sealing body 108.

As pressure within the flow passage 78 is increased, pressurized fluid will enter the annular seal pocket 96 and will bear upon both the annular sealing body 108 and the elastomeric sealing element 126. Because an initial seal has been established between the annular sealing body and the side surfaces 120 and 122 defining the primary seal pocket, initial leakage past the annular sealing body will be prevented. Pressure from the flow passage 92 will bear directly upon the annular sealing element 126, causing it to deform slightly because of its elastomeric composition. When this occurs, the force of the pressurized fluid is transmitted from the elastomeric sealing element 126 to the annular sealing lips 110 and 112 of the annular body, causing the lips to be urged more tightly against the respective side surfaces 120 and 122 of the primary seal pocket. Pressure therefore enhances the sealing ability of the seal assembly within the primary seal pockets, but the additional mechanical pressure that is developed between the annular sealing body, the hub and the annular seal carrier element 94 does not materially retard the capability of these parts to be free for relative rotational movement because of the friction resistant composition of the annular sealing body.

The annular recesses 88 and 89 of the respective hubs define a cylindrical surface against which the secondary sealing elements 106 establish initial sealing contact upon assembly of the swivel mechanism. The secondary sealing elements 106 may be composed of any suitable elastomeric sealing material, such as Viton, for example. The secondary sealing elements, in addition to providing O-ring type sealing capability to prevent leakage of pressurized medium between the seal carrier element 94 and the cylindrical surface defining the respective recesses 88 or 89, serve an additional function of preventing lubricant material from flowing from the swivel chamber to the primary seal assembly. As discussed above, lubricant material is injected into the chamber 56 through lubricant fittings 64. The secondary sealing elements 106 prevent the lubricant material from flowing from the swivel bearing chamber 56 through the joint between the friction resisting washer 42 and the respective hubs where it might otherwise flow along the seal carrier element to the primary seal assembly. Additionally, annular sealing elements 128 and 130, such as Viton O-rings, may be retained within appropriate grooves formed in the housing structure and may prevent lubricant from leaking from the swivel bearing chamber.

Each of the various swivel devices of a swivel joint construction embodying this invention are capable of being disassembled for the purpose of repair or replacement. After the housing structure has been separated from the hubs simply by removing the bolts 52, a flow line segment, together with its hub structure, may be moved linearly relative to the opposite hub structure, which not only separates the hubs 38 and 40 but extracts the seal carrier element 94 from at least one of the recesses 88 or 90 defining the elongated seal carrier receptacle. After this has been accomplished, the bearing 68 and bearing retainer segments will be in assembly with the hub 38 as shown in FIG. 2. In the event it is desired to replace the bearing, the bearing will be moved to the left, thus clearing it from its encircling relation about the segmented cylindrical surface 86. After so removing the bearing, the spring retainer ring 84 is removed from the segmented groove 82, thus freeing the segments from the assembled relation thereof about the hub 38 and allowing the segments to be withdrawn by radial movement relative to the hub. After this has been accomplished, the bearing may be passed over the small diameter flange 44 thus separating it from the hub 38, after which a replacement bearing may be installed by passing it over the flange 44 in the manner described above. The bearing retainer segments 70 and 72 are then positioned as shown in FIG. 2 and the retainer ring 84 is positioned within its groove 82 to retain the segments in assembled reltaion with the hub 38. With the bearing so placed, the seal carrier element 94, with new primary and secondary seals installed, is inserted into one of the recesses 88 or 90 and the friction resistant washer is positioned about the seal carrier element. The hubs 38 and 40 are then moved into assembled relation as shown in FIG. 2, after which the body sections 50 are assembled about the hubs and bearing. Bolting of the body section by means of bolts 50 completes the repair operation.

When the swivel structure is assembled, the thrust support surfaces 62 and 64 of the housing structure will cause the bearing and thrust transmitting flanges of the hub structure to be so positioned that the primary seal assemblies are caused to yield from the uncompressed condition thereof, shown in FIG. 5, toward a linearly compressed condition, where the sealing lips 110 and 112 are caused to move more closely together by the opposed side surfaces 120 and 122 of the respective primary seal pocket. An initial mechanical seal is formed thereby in addition to the initial mechanical seal formed by the secondary sealing elements between the seal carrier element and the respective hubs. Low pressure leakage will be prevented by this initial sealing capability. As pressure within the flow passage 92 increases, this pressure will enter the primary seal pockets and will act upon the annular relatively hard sealing body 108 and upon the elastomeric annular sealing element 126. The effect of pressure will have a tendency to cause spreading of annular sealing lips, thereby further enhancing the sealing engagement between the lips and the respective side walls of the seal pocket. The sealing ability of the primary seal assemblies is therefore enhanced in direct proportion to increase in pressure within the flow passage 92.

In view of the foregoing, it is quite clear that a novel swivel structure has been provided for movable flow lines which is capable of maintaining a positive seal against leakage of fluid at all pressure ranges through incorporation of primary and secondary sealing elements that function to prevent such leakage. In addition, a swivel joint construction has been provided that effectively allows relative rotation of various sections of a segmented flow line construction and does not allow high stresses to be induced to the flow line structure that would otherwise cause rupture or malfunction thereof. A swivel construction has been provided that may be easily and simply disassembled for replacement of the bearing and seals or repair of the various parts thereof. Even though the swivel structure is readily rotatable, responsive to forces applied thereto, the swivel structure provides effective sealing capability at all pressure ranges thereof and functions also to prevent contamination of the bearing of the swivel structure by any leakage. The design and manufacturing costs of the swivel structure is maintained at a simple and low cost nature because the hub elements, together with the transition type seal assembly, are the only pressure containing structures of the swivel mechanism. The housing is not required to withstand the pressure of the fluid medium within the swivel structure and therefore does not need to be of sufficient strength to withstand the radial stresses that will be caused by severely high pressure conditions. The housing structure is required only to withstand the thrust forces applied thereto by the thrust transmitting flanges through the thrust bearing. The swivel structure is also provided with an efficient lubrication system causing the bearings to be effectively lubricated during use. Moreover, the lubrication system is so designed as to promote simple and efficient lubrication servicing while the apparatus is in service and under pressure to enhance the service life of the swivel construction.

It is therefore seen that this invention is one well adapted to attain all of the features and advantages hereinabove set forth, together with other features and advantages which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A swivel joint construction for movable flow lines, said swivel joint construction comprising:
   a pair of hub elements each defining openings that cooperate to define a flow passage through said swivel joint construction, one of said hub elements defining first annular planar thrust transmitting shoulder means oriented in substantially normal relation with the axis of rotation of said swivel joint and the other of said pair of hub elements defining second annular planar thrust transmitting shoulder means of larger diameter as compared to said first thrust transmitting shoulder means and being in substantially parallel relation with said first thrust transmitting shoulder means;
   a roller thrust bearing assembly of circular form defining an inner peripheral dimension of larger diameter as compared to the outer peripheral diameter of said first thrust transmitting shoulder means allowing said bearing assembly to pass over said first thrust transmitting shoulder means and adapted to be received in encircling spaced relation about said one of said hub elements;
   segmented bearing retainer means adapted to be assembled at least partially about said one of said hub elements and cooperating with said first thrust transmitting shoulder means to define bearing thrust shoulder means of substantially the same dimension as said second thrust transmitting shoulder means; and
   split housing means adapted to be positioned about said hub elements and enclosing said bearing assembly and bearing retainer means, said housing means defining opposed spaced thrust support surface means said bearing assembly engaging one of said thrust support surface means and developing a rotatable relation between said one of said hub elements and said housing means, said second thrust transmitting shoulder means engaging the other of said thrust support surface means.

2. A swivel joint construction as recited in claim 1, wherein:
   said first and second thrust transmitting shoulder means are defined by circular flange elements extending from respective ones of said hub elements, one of said flange elements being of sufficiently small outer peripheral diameter to permit movement of said bearing assembly thereover.

3. A swivel joint construction as recited in claim 2, wherein said segmented bearing retainer means comprise:
   a plurality of bearing retainer segments being positionable in mating assembled relation about said one of said hub elements and cooperating to define segmented bearing retainer surface means of generally cylindrical form, the inner periphery of said bearing assembly being positionable in fitted relation about said bearing retainer surface means.

4. A swivel joint construction as recited in claim 3, wherein:
   said bearing retainer segments cooperate with said first thrust transmitting shoulder means to define thrust transmitting shoulder means for thrust force transmitting engagement with said bearing assembly.

5. A swivel joint construction as recited in claim 1, wherein:
   said first thrust transmitting shoulder means is a circular flange extending from one of said hub elements and being of sufficiently small diameter as to permit passage of said bearing assembly thereover; and
   said bearing retainer means is defined by a plurality of bearing retainer segments being positioned about said one of said hub elements and cooperating with said flange to define bearing thrust transmitting means transmitting thrust forces between said bearing means and said flange.

6. A swivel joint construction as recited in claim 5, wherein:
   said bearing thrust transmitting means is a segmented thrust transmitting flange defined cooperatively by said bearing retainer segments.

7. A swivel joint construction as recited in claim 6, wherein:
   said bearing retainer segments cooperate to define bearing support surface means, said bearing means being positioned in encircling and fitting relation about said bearing support surface means.

8. A swivel joint construction as recited in claim 3, wherein:
   segment retainer means is positioned in engagement with said plurality of bearing retainer segments, said segment retainer means securing said bearing retainer segments in assembly about said one of said hub elements.

9. A swivel joint construction as recited in claim 8, wherein:
   said bearing retainer segments are each formed to define a retainer groove segment, said retainer groove segments cooperating upon assembly of said bearing retainer segments to said one of said hub elements to define an annular retainer groove; and
   a spring retainer ring being received within said annular retainer groove and maintaining said bearing retainer segments in the assembled condition thereof.

10. A swivel joint construction as recited in claim 1, wherein:
    said hub elements cooperate to define an internal seal receptacle; and
    seal means is disposed within said internal seal receptacle and establishes sealed relation with each of said hub elements.

11. A swivel joint construction as recited in claim 1, wherein:
    each of said hub elements is formed to define an internal seal recess and said seal recesses of each of said hub elements in the assembled relation of said hub elements cooperate to define an elongated annular seal recess;
    said seal means includes an elongated annular structural element spanning the joint between said hub elements and cooperating with said hub elements to define opposed annular primary seal pocket means; and
    a pair of annular seal means being disposed within each of said primary seal pockets, said seal elements establishing an initial mechanical seal and being responsive to pressure within said flow passage means for increasing the sealing ability thereof.

12. A swivel joint construction as recited in claim 11, wherein each of said primary seal elements comprises:
    an annular sealing body being composed of sealing material having low friction characteristics and defining an inner seal groove therein; and an annular inner sealing element being disposed within said inner seal groove and establishing seals with said outer sealing body and with said elongated annular structural element.

13. A swivel joint construction as recited in claim 11, wherein:
secondary sealing element means is interposed between said elongated annular structural element and said hub elements, said secondary sealing elements cooperating with said annular sealing elements to provide sealing between said elongated annular structural element and said hub elements.

14. A swivel joint construction as recited in claim 1, wherein:
each of said hub elements is formed to define an internal seal recess and said seal recesses, in the assembled relation of said hub elements, cooperate to define an elongated annular seal recess having a joint intermediate the extremities thereof;
said seal means is defined by an elongated structural element spanning the joint between said hub elements and cooperating with said hub elements to define a pair of opposed primary annular seal pockets and a plurality of secondary annular seal pockets;
a pair of primary sealing elements being disposed one within each of said primary annular seal pockets, said primary sealing elements establishing a primary fluid seal between said elongated structural element and respective ones of said hub elements; and
at least a pair of secondary sealing elements being disposed one within each of said secondary sealing pockets and developing secondary seals between said elongated structural element and respective ones of said hub elements.

15. A swivel joint construction for movable flow lines, said swivel joint construction comprising:
a pair of hub elements each having an opening formed therein, said elements cooperating to define flow passage means through said swivel joint and to define seal recess means;
means for interconnecting said hub elements with a flow line;
thrust transmitting flange means being provided on each of said hub elements, one of said flange means being of smaller diameter than the other flange means;
thrust bearing means being received about one of said hubs and being of sufficient internal dimension to pass over said one thrust transmitting flange means;
segmented bearing retainer means being interposed between said bearing means and said thrust transmitting flange means and being in thrust force transmitting relation therebetween, said bearing retainer means being received in mating engagement about said one of said flange means and cooperating therewith to define a thrust transmitting flange assembly of substantially the same outer peripheral dimension as said other of said flange means, said bearing means encircling said segmented bearing retainer means;
split means enclosing said thrust transmitting flange means, bearing means and bearing retainer means, said housing means defining spaced thrust support means, said bearing means being in engagement within one of said thrust support means and providing for rotation of said hub means relative to said housing means, the other of said thrust transmitting flange means being in engagement with the other of said spaced thrust support means; and
seal means being disposed within said seal recess and establishing seals with respect to each of said hub elements.

16. A swivel joint construction as recited in claim 15, wherein:
one of said hub elements is rotatable with respect to said housing means and said smaller dimensioned thrust transmitting flange means is formed integrally with said rotatable hub element; and
said bearing being interposed between said segmented thrust transmitting surface and said thrust support means of said housing means.

17. A swivel joint construction as recited in claim 16, wherein said segmented retainer means comprises:
a plurality of bearing retainer segments being positioned about said rotatable hub element and cooperating to define a generally cylindrical segmented bearing retainer surface; and
said bearing means being disposed in close fitting relation about said segmented bearing retainer surface.

18. A swivel joint construction as recited in claim 15, wherein:
each of said hub elements is formed to define an internal seal recess and said seal recesses of each of said hub elements in the assembled relation of said hub elements cooperate to define an elongated annular seal recess;
said seal means includes an elongated annular structural element spanning the joint between said hub elements and cooperating with said hub elements to define opposed annular primary seal pocket means; and
a pair of annular seal means being disposed on within each of said primary seal pockets, said seal elements establishing an initial mechanical seal and being responsive to pressure within said flow passage means for increasing the sealing ability thereof.

19. A swivel joint construction as recited in claim 18, wherein:
an annular sealing body being composed of sealing material having low friction characteristics and defining an inner seal groove therein; and
an annular inner sealing element being disposed within said inner seal groove and establishing seals with said outer sealing body and with said elongated annular structural element.

20. A swivel joint construction as recited in claim 18, wherein:
secondary sealing element means is interposed between said elongated annular structural element and said hub elements, said secondary sealing elements cooperating with said annular sealing elements to provide sealing between said elongated annular structural element and said hub elements.

21. A swivel joint construction as recited in claim 15, wherein:
each of said hub elements is formed to define an internal seal recess and said seal recesses, in the assembled relation of said hub elements, cooperate to define an elongated annular seal recess having a joint intermediate the extremities thereof;
said seal means is defined by an elongated structural element spanning the joint between said hub elements and cooperating with said hub elements to define a pair of opposed primary annular seal pockets and a plurality of secondary annular seal pockets;

a pair of primary sealing elements being disposed one within each of said primary annular seal pockets, said primary sealing elements establishing a primary fluid seal between said elongated structural element and respective ones of said hub elements; and at least a pair of secondary sealing elements being disposed one within each of said secondary sealing pockets and developing secondary seals between said elongated structural element and respective ones of said hub elements.

* * * * *